United States Patent
Shoaib et al.

(10) Patent No.: US 7,243,263 B2
(45) Date of Patent: Jul. 10, 2007

(54) METHOD FOR DYNAMICALLY SWITCHING FAULT TOLERANCE SCHEMES

(75) Inventors: Shahid Shoaib, San Jose, CA (US); Nayeem Islam, Palo Alto, CA (US)

(73) Assignee: NTT Docomo, Inc., Tokyo (JP)

( * ) Notice: Subject to any disclaimer, the term of this patent is extended or adjusted under 35 U.S.C. 154(b) by 0 days.

(21) Appl. No.: 10/817,112

(22) Filed: Apr. 1, 2004

(65) Prior Publication Data

US 2004/0205373 A1 Oct. 14, 2004

Related U.S. Application Data

(63) Continuation of application No. 10/243,083, filed on Sep. 13, 2002, now Pat. No. 6,745,339.

(51) Int. Cl.
*G06F 11/00* (2006.01)

(52) U.S. Cl. .......................... 714/20; 705/36

(58) Field of Classification Search .............. 714/6, 714/7, 8, 11, 13, 20, 2, 15, 16; 709/224, 709/223, 220; 705/36
See application file for complete search history.

(56) References Cited

U.S. PATENT DOCUMENTS

| | | | | |
|---|---|---|---|---|
| 5,280,607 A * | 1/1994 | Bruck et al. | .................... | 714/4 |
| 5,367,668 A * | 11/1994 | Pandolfo | ..................... | 714/12 |
| 5,828,847 A * | 10/1998 | Gehr et al. | ................. | 709/239 |
| 5,963,540 A * | 10/1999 | Bhaskaran | ................. | 370/218 |
| 6,195,680 B1 * | 2/2001 | Goldszmidt et al. | ........ | 709/203 |
| 6,446,218 B1 * | 9/2002 | D'Souza | ......................... | 714/4 |
| 6,453,468 B1 * | 9/2002 | D'Souza | ..................... | 717/168 |
| 6,618,817 B1 * | 9/2003 | Armstrong | ..................... | 714/4 |
| 6,674,713 B1 * | 1/2004 | Berg et al. | ................. | 370/217 |
| 6,745,339 B2 * | 6/2004 | Shoaib et al. | .................. | 714/1 |
| 2004/0111510 A1* | 6/2004 | Shoaib et al. | ............... | 709/224 |

* cited by examiner

*Primary Examiner*—Nadeem Iqbal
(74) *Attorney, Agent, or Firm*—Blakely, Sokoloff, Taylor & Zafman LLP

(57) ABSTRACT

In one aspect of the invention, a method of dynamically switching among a plurality of fault tolerance schemes is provided. The fault tolerance schemes are associated with a fault tolerance mechanism that executes in a distributed system. The method comprises obtaining a wait time of at least one user interface event occurring in the distributed system. The wait time includes at least one of a communications time, a service time and a fault tolerance time. The method further comprises determining whether a mean of the wait time is greater than a predetermined mean wait time threshold. The method also comprises determining whether the communications time, the service time and the fault tolerance time are mutually independent when the mean of the wait time is greater than the predetermined mean wait time threshold. In addition, the method comprises determining whether the mean of the wait time can be improved by reducing a mean of the fault tolerance time when the communications time, the service time and the fault tolerance time are mutually independent. The method also comprises switching from a first fault tolerance scheme to a second fault tolerance scheme when the wait time can be improved by reducing the mean of the fault tolerance time.

12 Claims, 4 Drawing Sheets

METHOD FOR DYNAMICALLY SWITCHING FAULT TOLERANCE SCHEMES

This application is a continuation of application Ser. No. 10/243,083, entitled "Method for Dynamically Switching Fault Tolerance Schemes," filed Sep. 13, 2002 now U.S. Pat. No. 6,745,339 and assigned to the corporate assignee of the present invention.

BACKGROUND OF THE INVENTION

The present invention relates generally to fault tolerant distributed computing systems, and in particular, to a method for dynamically switching fault tolerance schemes in a distributed system based on wait times of user interface events.

Fault tolerance is a key technology in distributed systems for ensuring reliability of operations for user critical applications such as e-commerce, database transactions and B2B, etc. A distributed system is a group of computing devices interconnected with a communication network which function together to implement an application. Fault tolerance provides reliability of operation from the user's perspective by masking failures in critical system components. Known fault tolerant mechanisms for distributed systems can use different fault tolerance schemes, including different fault detection and recovery means, to handle various types of failures, such as device and network failures.

However, it is known that fault tolerance schemes may have different fault tolerance and performance trade-offs. In the context of interactive applications, fault tolerance schemes can have an adverse effect on the time that a user has to wait for a system response once the user interacts with the system, particularly in mobile computing environments. This delay can affect user perception of the performance of a system, which is significant because users are known to give up on applications if their requests are not met within certain time limits. Accordingly, it is desirable to limit detrimental trade-offs between fault tolerance and perceived system performance.

Furthermore, different applications may have different requirements for fault tolerance and performance. In addition, these requirements may change over the course of execution of the same application. It may be that no particular implementation of a fault tolerance mechanism will perform well for all applications. In this context, it is important to know when to switch fault tolerance schemes and which scheme to dynamically select.

Therefore, there is a need for a method of dynamically switching fault tolerance schemes that can improve the user perceived performance of a system while taking into account the desired level of fault tolerance.

SUMMARY

In one aspect of the invention, a method of dynamically switching among a plurality of fault tolerance schemes is provided. The fault tolerance schemes are associated with a fault tolerance mechanism that executes in a distributed system. The method comprises obtaining a wait time of at least one user interface event occurring in the distributed system. The wait time includes at least one of a communications time, a service time and a fault tolerance time. The method further comprises determining whether a mean of the wait time is greater than a predetermined mean wait time threshold. The method also comprises determining whether the communications time, the service time and the fault tolerance time are mutually independent when the mean of the wait time is greater than the predetermined mean wait time threshold. In addition, the method comprises determining whether the mean of the wait time can be improved by reducing a mean of the fault tolerance time when the communications time, the service time and the fault tolerance time are mutually independent. The method also comprises switching from a first fault tolerance scheme to a second fault tolerance scheme when the wait time can be improved by reducing the mean of the fault tolerance time.

In another aspect of the invention, a fault tolerant distributed system capable of dynamically switching among a plurality of fault tolerance schemes associated with a fault tolerance mechanism is provided. The system comprises a means for obtaining a wait time of at least one user interface event occurring in the distributed system. The wait time includes at least one of a communications time, a service time and a fault tolerance time. The system further comprises a means for determining whether a mean of the wait time is greater than a predetermined mean wait time threshold. The system also comprises a means for determining whether the communications time, the service time and the fault tolerance time are mutually independent when the mean of the wait time is greater than the predetermined mean wait time threshold. In addition, the system comprises a means for determining whether the mean of the wait time can be improved by reducing a mean of the fault tolerance time when the communications time, the service time and the fault tolerance time are mutually independent. The system also comprises a means for switching from a first fault tolerance scheme to a second fault tolerance scheme when the wait time can be improved by reducing the mean of the fault tolerance time.

DETAILED DESCRIPTION OF THE DISCLOSED EMBODIMENTS

Reference will now be made in detail to an implementation of the present invention as illustrated in the accompanying drawings. The disclosed embodiments of the present invention are described below using a reliable messaging system as an exemplary fault tolerance mechanism having multiple fault tolerance schemes with different performance trade-offs. However, it should be readily understood that a reliable messaging system is not the only vehicle for implementing the present invention, and the present invention may be implemented in a distributed system using other types of fault tolerance mechanisms. For example, any checkpoint-based rollback-recovery techniques for a message passing distributed system, including uncoordinated, coordinated, or communication induced checkpointing, would work.

Computing devices connected to a network in a distributed system, server and client devices, can communicate with each other by sending and receiving messages across the network via a reliable messaging system. A reliable messaging system is a fault tolerant message based communication mechanism for use in distributed systems with applications that require a high degree of reliability, such as web services, remote procedure calls, e-commerce transactions, etc. For example, a reliable messaging system that supports asynchronous operation using point to point messaging or a centralized messaging or queuing server, i.e. imposes no limit on the time it takes to send or receive messages over a network, allows interconnected devices to communicate with each other even if one of the devices is temporarily unavailable. Such a reliable messaging system can also reliably deliver messages according to application specified delivery semantics, such as at most once or at least once, in the presence of device and network failures.

In particular, a reliable messaging system can implement different types of message logging schemes that affect the type and extent of fault tolerance possible as well as the system performance. For example, both clients and servers in a distributed system have multiple options as to the direction of logging, including for outgoing messages only, for incoming messages only or for both directions. In addition, a client may perform message logging before sending an outgoing message, after sending an outgoing message or asynchronously. Likewise, a server may log messages before or after delivering an incoming message to the application or asynchronously. In addition to the types and extent of failures that can be tolerated, the direction and timing specified by different message logging schemes also affect the processing overhead incurred and the complexity involved in the recovery itself, which in turn affect the system performance.

Figure 1:
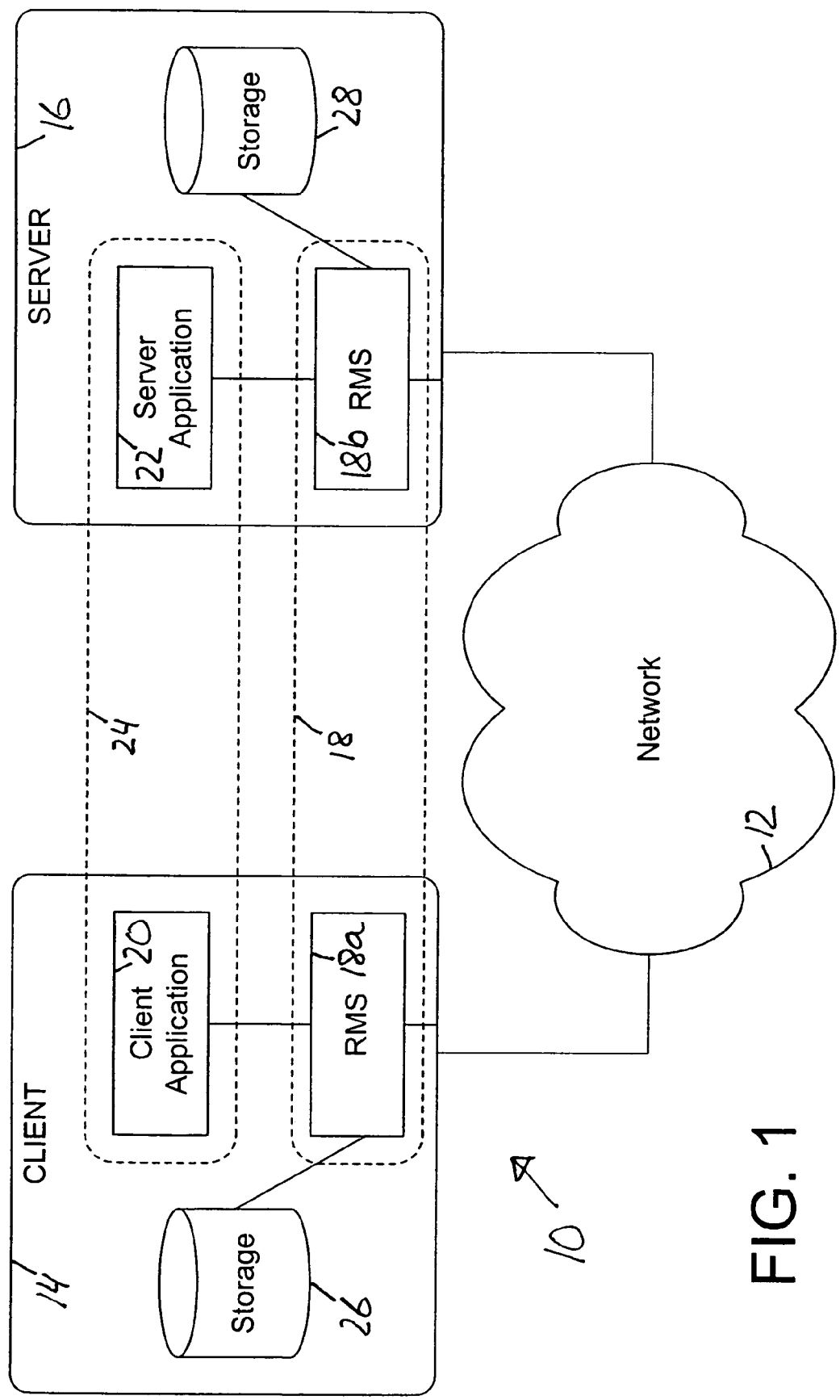
FIG. 1 is a block diagram of a model distributed system for implementing a method for dynamically switching fault tolerance schemes according to the present invention.

Referring to FIG. 1, there is shown a model distributed system 10 that includes a network 12 connected to a client device 14 and a server device 16, which communicate with each other across the network using a reliable messaging system 18. The reliable messaging system 18 includes a client module 18a executing on the client 14 and a server module 18b executing on the server 16. In particular, a client application 20 that executes on the client 14 and a server application 22 that executes on the server 16 are components of a distributed application 24. The client and server applications 20 and 22 use message passing via the reliable messaging system 18 to coordinate distributed processing for the application 24. For example, the server application 22 may be a database engine that manages data storage and retrieval on the server 16, while the client application 20 may be a web browser responsible for presenting the data on the client 14. Together, the server and client application would form one distributed database application 24 from the user's perspective for the purpose of dynamically switching fault tolerance schemes according to the present invention.

While the model distributed system 10 of FIG. 1 illustrates a client-server architecture, it should be understood that this architecture is meant to be illustrative, rather than limiting. Other types of distributed computing systems could also be used for dynamically switching fault tolerance schemes according to the present invention, and in particular the message logging schemes described further below. For example, multiple client devices may communicate to each other via the reliable messaging system 18 in a peer-to-peer or adhoc networking mode and multiple server devices also may communicate to each other via the reliable messaging system for back end processing.

Figure 2:
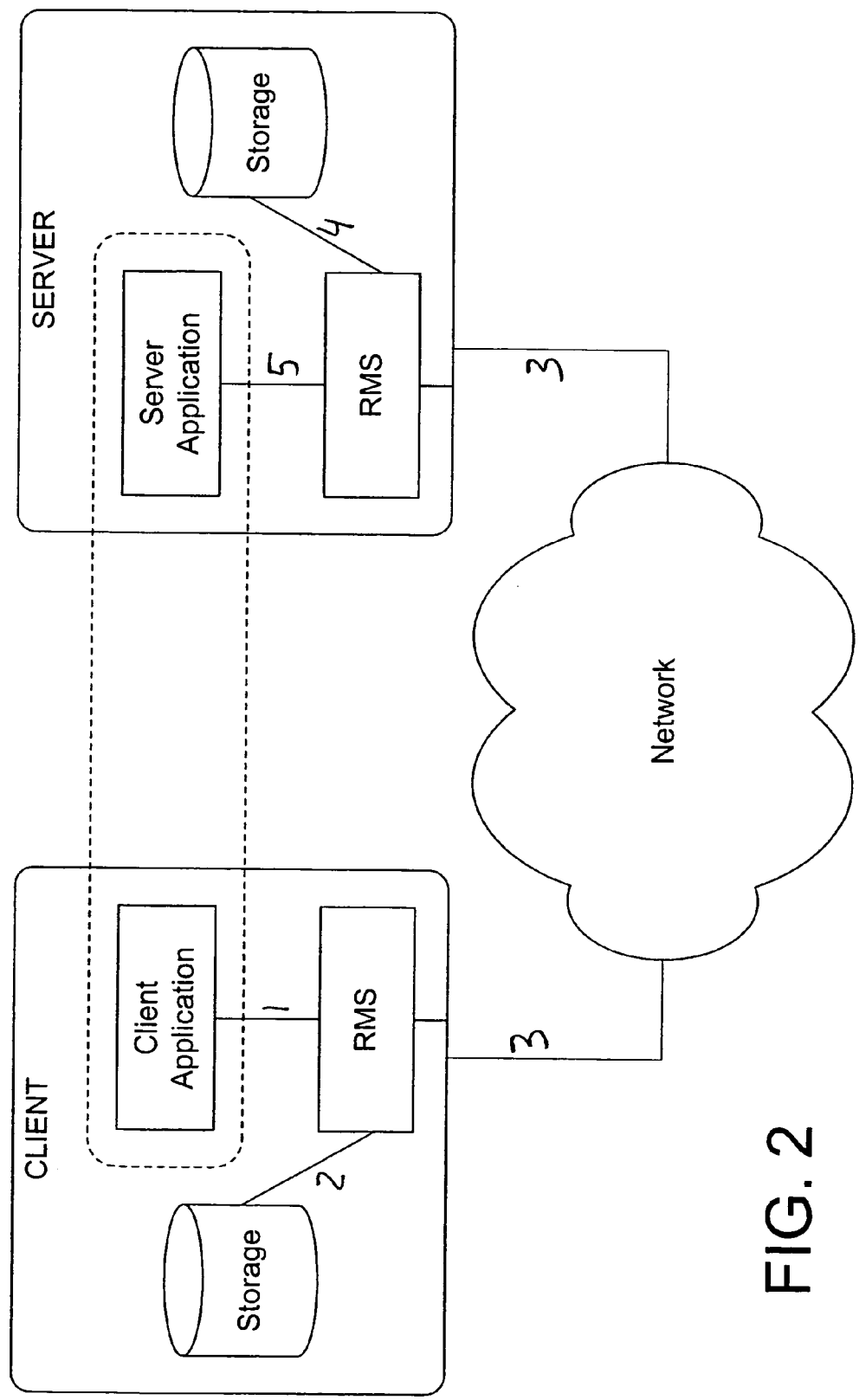
FIG. 2 is a block diagram showing events associated with the message logging schemes of the reliable messaging system of FIG. 1.

According to one class of message logging schemes for the reliable messaging system 18, shown below in Table 1, messages can be logged to a persistent storage 26 on the client 14 and to a persistent storage 28 on the server 16. The client/server message logging schemes listed in Table 1 are identified by a sequence of events. Specifically, a scheme "xyz" refers to an assumption that event x takes place before event y which takes place before event z. Similarly, a scheme "x$\underline{yz}$" means that event x takes place first followed by events y and z, which take place asynchronously. The following list of events are considered: the client application 20 generates an outgoing message, identified by the numeral "1"; the client 14 logs an outgoing message to a client persistent storage 26, identified by the numeral "2"; the client 14 sends an outgoing message or the server 16 receives an incoming message, identified by the numeral "3"; the server 16 logs an incoming message to a server persistent storage 28, identified by the numeral "4"; and the server 16 delivers an incoming message to a server application 22, identified by the numeral "5". These events are illustrated graphically in FIG. 2.

The following shorthand notation is used to refer to entities that may be recovered due to failures: CD means that the client device is recoverable, SD means that the server device is recoverable, NT means that the network is recoverable, –X means that entity X (CD, SD or NT) is not recoverable, X (out) means that entity X (CD, SD or NT) may recover outgoing messages only, and X (in) means that entity X (CD, SD or NT) may recover incoming messages only X if Y means that entity X (CD, SD or NT) may be recovered only if entity Y (CD, SD or NT) is available at time of recovery.

TABLE 1

| Scheme | Recoverable | Properties |
| --- | --- | --- |
| 12345/54321 | CD; SD; NT | Easy recovery, performance overhead, more delay for application |
| 13254/53412 | CD; SD; NT | Easy recovery, performance overhead, least delay for application, small window of unrecoverable failures |
| 12345/54321 (asynchronous) | CD; SD; NT | Complicated recovery, performance overhead, less delay for application, small window of unrecoverable failures |

TABLE 1-continued

| Scheme | Recoverable | Properties |
| --- | --- | --- |
| Senders Only (process that sends/generates messages) 1235/5431 1325/5341 1235/5431 | NT; CD(out); CD(in) if SD, NT; SD(out); SD(in) if CD, NT | Complicated recovery, recovery requires sync and extra message exchange, reduced performance overhead (by half), slow down fast senders, small window of failure depending on synchrony and order |
| Receiver Only (process that receives messages) 1345/5321 1345/5321 1354/5312 | NT; CD(in); CD(out) if SD, NT; SD(in); SD(out) if CD, NT | Complicated recovery, recovery requires sync and extra message exchange, reduced performance overhead (by half), receiver further slowed down, small window of failure depending on synchrony and order |
| Both Sender, One Receiver 12345/5431 1235/54321 | NT; CD(out); SD(out); CD or SD(in) | Complicated recovery, recovery may require sync, reduce performance overhead by 25%. Slow down fast senders, small window of failure depending on order/synchrony |
| Both Receiver, One Sender 12345/5321 1345/54321 | NT; CD(in); SD(in); CD or SD(out) | Complicated recovery, recovery may require sync, reduce performance overhead by 25%. Receiver further slowed, small failure window depending on synchrony/order |

The client/server message logging schemes listed in Table 1 provide a relatively high level of fault tolerance for the model distributed system 10 of FIG. 1. But these schemes also incur a relatively high performance overhead since all incoming and outgoing messages on both the server 16 and the client 14 are logged. Client/server logging may be useful for applications that require highest degree of fault tolerance e.g. e-commerce transactions.

Alternatively, the model distributed system 10 shown in FIG. 1 may log messages to the persistent storage 26 on the client 14 only. Several client side logging schemes are possible, as shown below Table 2.

Client side logging schemes are useful in situations where the server 16 is overloaded or is unable to log messages and the client 14 has sufficient processing capabilities to perform message logging operations. These schemes may also be useful if client fault tolerance is more valuable than server fault tolerance to the recovery of an application in the presence of a fault. For example, if it is known that a server system is highly reliable while a client system (e.g. mobile terminal) is unreliable and suffers frequent transient failures, then client side logging schemes may be more important.

Likewise, the model distributed system 10 of FIG. 1 may log messages to the persistent storage 28 on the server 16 only, as shown below in Table 3.

TABLE 2

| Combination | Recoverable | Properties |
| --- | --- | --- |
| 1235 | CD(out); -CD(in); NT; -SD (out); SD(in) if CD, NT | Easy recovery, performance overhead at client, longer delay for server app, s (in) recovery may require sync and extra message exchange, reduce overall performance overhead by 75% |
| 1325 | CD(out); -CD(in); NT; -SD(out); SD(in) if CD, NT | Easy recovery, performance overhead at client, least delay for application, small window of unrecoverable failures, s (in) recovery requires sync & msg exchange, reduce overall performance overhead by 75% |
| 1235 | CD(out); -CD(in); NT; -SD(out); SD(in) if CD, NT | Complicated recovery, performance overhead at client, less delay for app, small window of unrecoverable failures, s (in) recovery requires sync & msg exchange, reduce overall performance overhead by 75% |
| 5312 5321 5312 | -CD(out); CD(in); NT; -SD | Complicated recovery for async, further slow down receivers, small window of failure depending on synchrony and order, reduce overall performance overhead by 75% |
| Both directions 1235/5321 1235/5321 | CD; NT; SD(in) if CD, NT | Complicated recovery, server recovery requires sync and extra message exchange, reduce overall performance overhead (by half), small window of failure depending on synchrony and order |

TABLE 3

| Combination | Recoverable | Properties |
|---|---|---|
| 5431 | SD(out); -SD(in); NT; -CD(out); CD(in) if SD, NT | Easy recovery, performance overhead at server, longer delay for client app, c (in) recovery may require sync and extra message exchange, reduce overall performance overhead by 75% |
| 5341 | SD(out); -SD(in); NT; -CD(out); CD(in) if SD, NT | Easy recovery, performance overhead at server, least delay for client app, small window of unrecoverable failures, c (in) recovery requires sync & msg exchange, reduce overall performance overhead by 75% |
| 5431 | SD(out); -SD(in); NT; -CD(out); CD(in) if SD, NT | Complicated recovery, performance overhead at server, less delay for client app, small window of unrecoverable failures, c (in) recovery requires sync & msg exchange, reduce overall performance overhead by 75% |
| 1345 1354 1345 | -SD(out); SD(in); NT; -CD | Complicated recovery for async, further slow down receivers, small window of failure depending on synchrony and order, reduce overall performance overhead by 75% |
| Both directions 5431/1345 5431/1345 | SD; NT; CD(in) if SD, NT | Complicated recovery, client recovery requires sync and extra message exchange, reduce overall performance overhead (by half), small window of failure depending on synchrony and order |

The class of server side logging schemes is useful in situations where the client 14 is overloaded or is unable to log messages and the server 16 has adquate processing capabilities to perform message logging operations. In addition, the server 16 may have specialized processing capabilities for logging messages, including dedicated hardware resources that reduce the burden on the server's main processor, which services user requests from the client. Server side logging schemes may also be appropriate if server fault tolerance is more useful than client fault tolerance in order to tolerate failures, such as with a transaction server. The fault tolerance properties provided by server side logging schemes are symmetric to those of client side logging schemes, but the performance properties of server side logging may be different from client side logging because server and client devices typically have different hardware resources.

Figure 3:
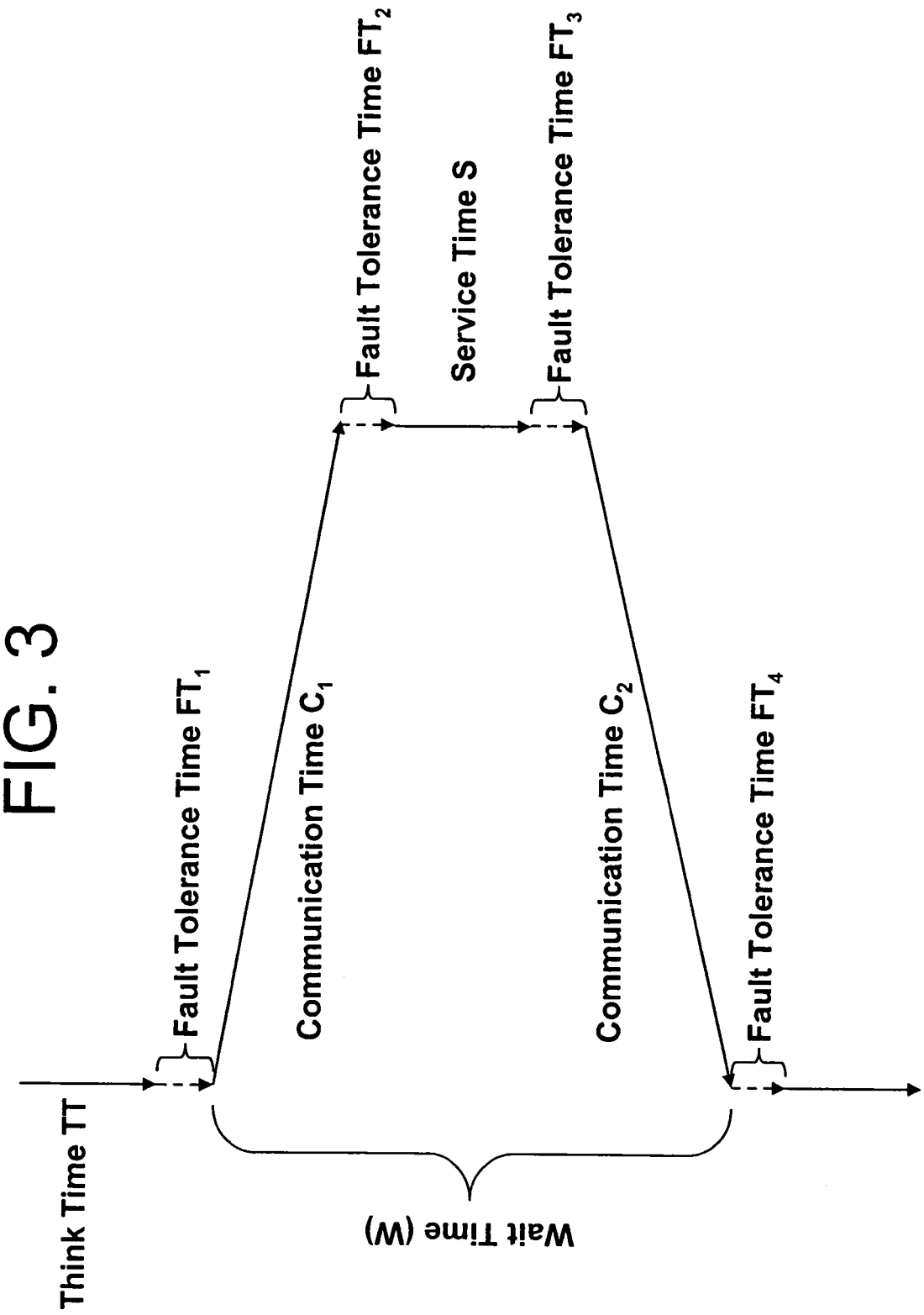
FIG. 3 is a block diagram showing a timeline of user interface events in the distributed system of FIG. 1.

In order to explain the performance improvements made possible by switching fault tolerance schemes according to the present invention, a timeline for user interactions with an application is shown in FIG. 3. A user moves through alternate think times TT and wait times W while interacting with an application. At the end of each think time, the user sends a request to the application and waits for a reply. This is referred to as a user interface event. For example, users can request information from the application using a web browser by posting web page forms or by clicking on Uniform Resource Locator ("URL") link to get a web page. These actions are referred to as user interface events. The application typically waits in a loop for requests from the user. On receiving a request, the application may perform computations and access data to fulfill the user's request. It will then send back a reply to the user.

The wait time W of a user interface event is the time associated with processing a user request for the event. It is known that the mean and variance of the wait times affect a user's perception of the performance of a system. As described in greater detail further below, a fault tolerance switching algorithm according to the present invention can switch fault tolerance schemes based on measured wait times in order to improve the user perceived system performance.

Referring again to the model distributed system 10 of FIG. 1, a user can operate the client application 20 to send a request to the server application 22 via the reliable messaging system 18. In this case, the wait time W of user interface event for the distributed application 24 can be broken down into 1) the total time spent in communications between the client 14 and server 16, 2) the total service time to fulfill the user request, including the time spent in computation and data input/output operations by the requested server application 22, and 3) the total time spent in fault tolerance, including the time spent in fault tolerance on the client 14 and the server 16.

Accordingly, the following calculation can be made:

$$W = C + S + FT \tag{1}$$

Where:
  W is the wait time;
  C is the total time spent in communications and it is the sum of communication times in both directions, $C_1$ and $C_2$;
  S is the total service time and it is the sum of time spent in computation plus data I/O time; and
  FT is the total time spent in fault tolerance and it is the sum of the total fault tolerance time on the server, $FT_2$ and $FT_3$, and the total fault tolerance time on the client, $FT_1$ and $FT_4$.

If the parameters C, S and FT are continuous random variables, then the following relationships hold for their means:

$$m(W) = m(C) + m(S) + m(FT) \tag{2}$$

Where:
  m(W) is the mean of the wait time;
  m(C) is the mean of the total time spent in communications;
  m(S) is the mean of the total service time; and m(FT) is the mean of the total time spent in fault tolerance;

Moreover, if the parameters C, S and FT are also mutually independent, then the following relationship holds for their variances:

$$v(W)=v(C)+v(S)+v(FT) \quad (3)$$

Where:
v(W) is the variance of the wait time;
v(C) is the variance of the total time spent in communications;
v(S) is the variance of the total service time; and
v(FT) is the variance of the total time spent in fault tolerance.

However, those skilled in the art will recognize that these calculations are equally applicable to other configurations of the distributed application 24 in the model distributed system 10 of FIG. 1, such as when a user operates one client to request an application that will execute remotely on another client.

The significance of the restriction of mutual independence on the parameters C, S, and FT is that it allows each of their means, and also each of their variances, to be optimized independently of each other according to Equation (2) and Equation (3). We treat the parameters C, S and FT as mutually independent up to certain thresholds, after which the condition no longer holds, based on the following observations.

First, the time spent in communications (C) is generally independent of the service time (S). However, the service time (S) at any given instant can depend on the current load on the server 16 or device processing the user request. In other words, the load on the server may be so great that the server is computationally too busy to timely process additional user requests. But the server load itself is dependant on the number of messages (N) being passed between the server 16 and the client 14. As a result, the service time (S) can be dependent on the number of messages (N). Similarly, the time spent in communications (C) can also depend on the number of messages (N) broadcast over the network 12 because network bandwidth can limit the amount of traffic carried by the network. Accordingly, when the number of messages (N) increases above a certain threshold, the service time (S) may increase because of the increased load on the server and the time spent in network communications (C) may increase because of network congestion. Therefore, there is an indirect relationship between the service time (S) and the time spent in communications (C) because of their mutual dependence on the number of messages (N).

Second, the time spent in communications (C) is generally independent of the time spent in fault tolerance (FT). However, the time spent in fault tolerance (FT), which includes the fault tolerance times on the client 14 and the server 16, can also depend at any given instant on the load on the server and the client. Therefore, the time spent in fault tolerance (FT) can depend on the number of messages (N) being passed between the client 14 and the server 16. As a result, there is an indirect relationship between the time spent in communications (C) and the time spent in fault tolerance (FT) because of their mutual dependence on the number of messages (N).

Third, while the time spent in fault tolerance (FT) is generally independent of the service time (S), again there is an indirect relationship between the parameters FT and S because of their mutual dependence on the number of messages (N).

These observations lead to the assumption that the parameters C, S and FT are mutually independent up to a certain threshold of the number of messages (N), after which they may become mutually dependant. The implication of this assumption is that it is possible to optimize the mean wait time (m(W)) by switching fault tolerance schemes to reduce any one of the parameters m(C), m(S) and m(FT) as long as the parameters C, S and FT are mutually independent. As soon as the mutual independence condition no longer holds, it becomes necessary to take into account the effect of switching fault tolerance schemes on each of the parameters m(C), m(S) and m(FT) in order to determine the overall effect on the mean wait time (m(W)) and the perceived system performance.

Figure 4:
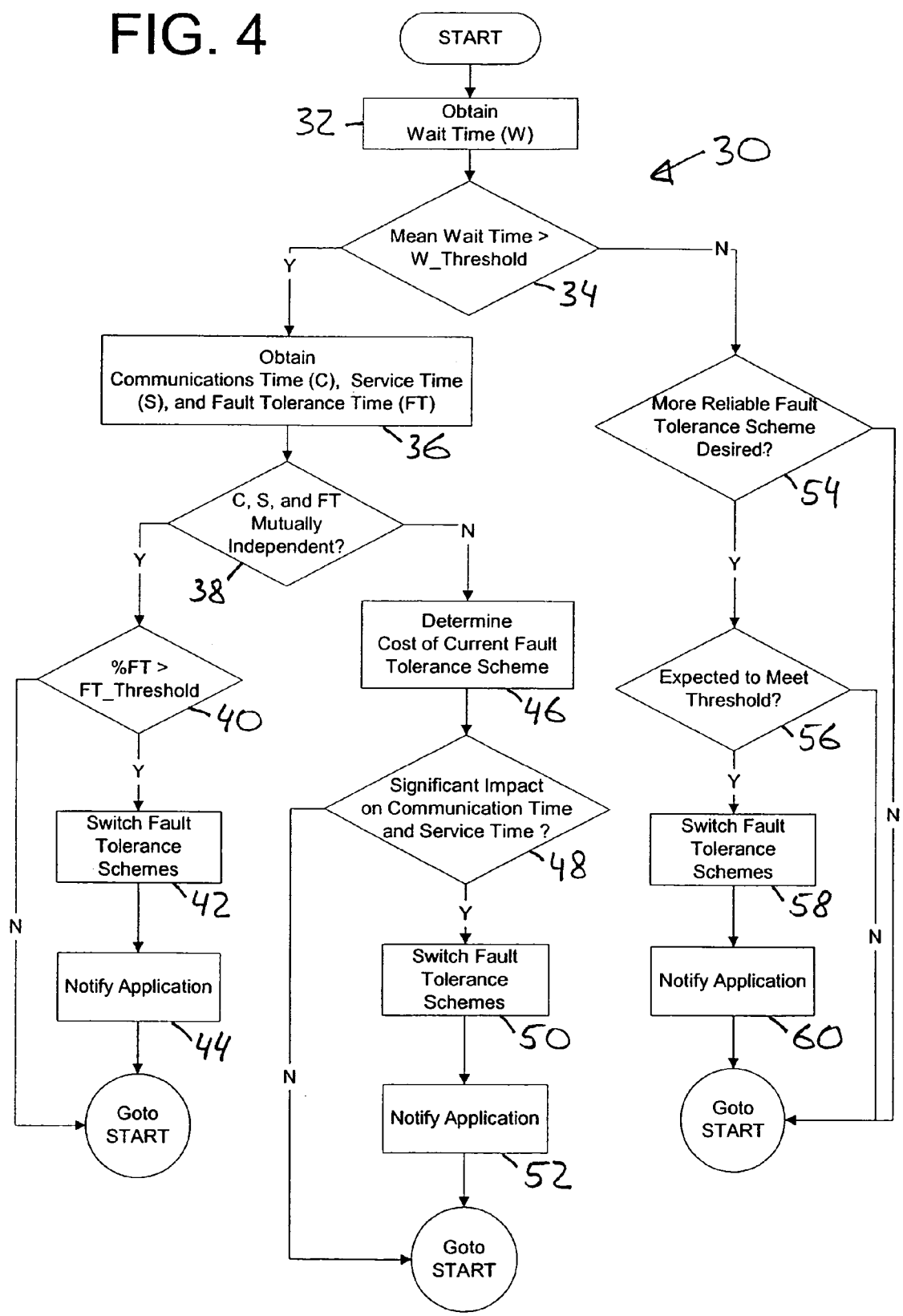
FIG. 4 is a flowchart for a method for dynamically switching fault tolerance schemes according to the present invention.

An implementation of an algorithm 30 for dynamically switching fault tolerance schemes based on wait times according to the present invention is illustrated using a decision tree in FIG. 4. This implementation is described in reference to the model distributed system of FIG. 1, for which wait times (W) are associated with user requests from the client application 20 to the server application 22. The switching algorithm 30 can execute continuously on the client 14 and the server 16 in order to switch message logging schemes for the reliable messaging system 18. Therefore, the switching algorithm may switch message logging schemes when the server application 22 is first requested or dynamically during its execution. When the switching algorithm 30 executes simultaneously on the client 14 and the server 16, any conflict between the two devices regarding the desired fault tolerance scheme can be resolved using a handshake protocol. The handshake protocol would allow the client 14 and the server 16 to exchange messages that enable them to agree on the fault tolerance scheme to be used.

As a first block 32, the switching algorithm 30 obtains values of measured wait times W and calculates a value of the mean wait time (m(W)) for an application. For example, the client 14 and server 16 in the distributed system of FIG. 1 can use timestamps for actions associated with user interface events of the distributed application 24 in order to measure wait times (W). Specifically, an HTML based client 14 can intercept all HTTP "GET" and "POST" requests from a web browser type client application 20 to the server application 22. When a "GET" or "POST" request is issued, the client 14 takes a first timestamp. When the "GET" or "POST" request returns and the reply generated by the server application is displayed using the browser, a second timestamp is taken by the client 14. The measured wait time (W) in this case is the difference between the second and first timestamps. The mean wait time (m(W) then is calculated from a plurality of measured values for wait times (W) using known statistical methods.

When the distributed application 24 begins execution, the switching algorithm 30 can obtain previously measured wait times W or a mean wait time (m(W)) from past runs of the distributed application. Once the distributed application 24 is executing, the switching algorithm 30 can calculate the mean wait time (m(W)) using current values of wait times W measured during the run in progress.

Next, the switching algorithm 30 determines whether the mean wait time (m(W)) is greater than a predetermined mean wait time threshold (T(W)) at block 34. The mean wait time threshold value (T(W)) can be set, for example, by a developer of the distributed application 24, a user interacting with the client 14, or a system administrator maintaining the server 16. Generally, the mean wait time threshold value (T(W)) will be the same for each component of the distributed application 24. However, priority can be assigned in the following order (highest to lowest): user preferences, system administrator, and application developer. Accordingly, the application developer may provide an initial value for the mean wait time threshold value (T(W)), which can be changed by the system administrator or the user. Once a mean wait time threshold is changed, the new threshold value is communicated to all devices executing the distributed application 24.

Several factors may influence the choice of a particular value for the mean wait time threshold (T(W)). For example, an application developer may select a mean wait time threshold value for an application based on the type of application. Accordingly, an interactive real-time network game may have a smaller mean wait time threshold, for example about 3 to 6 milliseconds, than a database application accessible via a web browsing application, which may have a mean wait time threshold of about 1 to 3 seconds. Also, user preferences for higher performance or more reliability may prompt a user to select a different value for the mean wait time threshold (T(W)) than the value selected by the application developer. Furthermore, the system administrator, for example, may change the mean wait time threshold (T(W)) in order to increase the server capacity.

In addition to providing the mean wait time threshold (T(W)) on a per application basis, the application developer, the user and the system administrator can provide a separate mean wait time threshold (T(W)) for different classes of user interface events of the application. In the latter case, wait times (W) could be measured for each class of user interface events associated with the application. The switching algorithm 30 then can determine whether the mean wait time for a particular class of user interface events is greater than a predetermined threshold and perform the functions described below in connection with different classes of user interface events rather than per application. Moreover, the user can override the mean wait time threshold(T(W)) set by the application developer at any time and ask for smaller wait times, possibly at the cost of less reliability, or more reliability, possibly at the cost of higher wait times.

Alternatively, the mean wait time threshold (T(W)) can be set based on a user profile. Specifically, a first user may find a given amount of wait time acceptable whereas a second user may find the same mean wait time threshold unacceptable, even for the same application. Therefore, a user profile that includes a mean wait time threshold value may be created based on a user's own perception of system performance. The user profile may specify the mean wait time threshold value on a per application basis. The user profile also may specify a mean wait time threshold value on a per application type basis, i.e., for different classes of related applications. Alternatively, the user profile may specify a value for the mean wait time threshold on a per device basis, such that the same mean wait time threshold is used by the algorithm when executing on a device regardless of the application requested.

It should be understood that the switching algorithm 30 also could calculate the variance of the measured wait times (W). The switching algorithm could then compare the variance wait time (v(W)), rather than the mean wait time (m(W)), with a predetermined variance wait time threshold.

Wait Time Threshold Exceeded

If the switching algorithm 30 determines that the mean wait time threshold (T(W)) has been exceeded at block 34, then the algorithm obtains values for the time spent in communications (C), the service time (S) and the time spent in fault tolerance (FT) at block 36. Those skilled in the art will recognize that, similar to the measurement of wait times W described above, the parameters C, S and FT can be measured using timestamps for actions associated with the communication process, the processing of a user request, and the fault tolerance mechanism respectively. For example, the client 14 and server 16 in the distributed system of FIG. 1 can calculate the time spent in fault tolerance (FT) for the reliable messaging system 18 by using timestamps at the start and end of a message logging operation.

Based on the measured values of the time spent in communications (C), the service time (S) and the time spent in fault tolerance (FT), the switching algorithm 30 will determine whether these parameters are mutually independent of each other at block 38. The determination of mutual independence for C, S and FT is dependant on the execution environment of the distributed application 24, the hardware resources, processing power, memory resources of the client 14 and the server 16. For a given execution environment, the parameters C, S and FT will be mutually independent up to a predetermined threshold value (T(N)) for the number of messages (N), as described above. Once the number of messages (N) exceeds the message threshold T(N), the parameters C, S, and FT are no longer treated as mutually independent. The value for the message threshold T(N) may be determined experimentally for a distributed application 24 in combination with different execution environments. That value then could be used for future execution of the distributed application 24 in similar environments.

If the parameters C, S and FT are mutually independent of each other, then the switching algorithm 30 will determine whether the mean wait time (m(W)) can be improved by reducing the mean time spent in fault tolerance (m(FT)) at block 40. In particular, the algorithm will determine whether the value of the mean time spent in fault tolerance (m(FT)) as a percentage of the mean wait time (m(W)) exceeds a predetermined threshold for fault tolerance (T(FT)). A value for the fault tolerance threshold (T(FT)) can be specified by a system administrator or the distributed application 24, for example.

If the fault tolerance threshold (T(FT)) for the current fault tolerance scheme is exceeded at block 40, then the switching algorithm 30 may switch fault tolerance schemes at block 42. The criteria for selecting a different fault tolerance scheme can include a set of predetermined requirements provided by the distributed application 24. For example, the distributed application may specify that a specific predetermined fault tolerance scheme is to be utilized whenever the fault tolerance threshold (T(FT)) is exceeded. A handshake protocol can ensure that the server and client are in agreement on the desired fault tolerance scheme that is to replace the existing scheme.

In addition, the criteria for selecting a fault tolerance scheme can be based on the implementation costs of different fault tolerance schemes. The implementation cost of a fault tolerance scheme is defined by the sum of the service time (S) and the time spent in fault tolerance (FT). The communication time (C) is ignored in these calculations. Implementation costs can be determined using timestamps to measure the service time (S) and the time spent in fault tolerance (FT). Devices forming part of a distributed system can then store and share implementation costs for various fault tolerance schemes. Implementation costs can be measured for individual fault tolerance schemes or for a class of fault tolerance schemes. The switching algorithm can use these implementation costs for different fault tolerance schemes to determine which of the schemes to select once the fault tolerance threshold (T(FT)) is exceeded. Accordingly, a new fault tolerance scheme that has a lower implementation cost than the current fault tolerance scheme may be selected in order to improve the mean wait time (m(W)).

For example, the reliable messaging system 18 may be using a message logging scheme in which the client 14 and the server 16 both log messages in both directions, i.e. incoming and outgoing messages. This scheme provides a relatively high level of fault tolerance as it allows recovery from failures of the client 14, server 16 and network 12. However, it also has a relatively high implementation cost because it requires multiple writes to persistent storage for storing messages and therefore requires more time spent in fault tolerance. In contrast, a scheme in which message logging is only performed while sending messages allows for complete recovery of any outgoing messages at the server 16 and client 14, but will recover received (incoming) messages at either the server or client only if the other entity is running and the network is available at the time of recovery. But, this scheme will have relatively lower implementation costs because it has one half the overhead of the previous scheme, which logged messages in both directions. Therefore, the switching algorithm may switch from the former to the latter message logging scheme in order to improve wait times if the fault tolerance threshold is exceeded.

Switching fault tolerance schemes may result in changing the reliability guarantees of the system. The switching algorithm 30 may consider for switching only those fault tolerance schemes that provide the same level of reliability as the scheme in use at the time that the determination is made. However, the algorithm allows the distributed application 24 or a user to specify otherwise. For example, an application may direct the algorithm to select fault tolerance schemes that will improve the mean wait time (m(W)) even though the chosen scheme provides less reliability than the fault tolerance scheme in use at the time of the determination. If the algorithm switches fault tolerance schemes at block 42, it will notify the distributed application 24, including the client application 20 and the server application 22, of any changes in reliability guarantees as well as any performance ramifications associated with the new fault tolerance scheme at block 44.

If the values of the parameters C, S and FT are determined to be mutually dependant on each other at block 38, than the switching algorithm will determine the cost of fault tolerance for the fault tolerance scheme in use at block 46. In other words, the switching algorithm will need to determine the effect that the time spent in fault tolerance (FT) is having on the time spent in communication (C), the time spent in service (S) and ultimately the wait time (W). If the algorithm determines that the current fault tolerance scheme has a significant impact, which is described in greater detail below, on the time spent in communication (C) and the time spent in service (S) at block 48, then the algorithm may switch the current fault tolerance scheme at block 50 and notify the distributed application 24, including the client application 20 and the server application 22, of any changes in reliability guarantees as well as any performance ramifications at block 52. The criteria for selecting a fault tolerance scheme at block 50 can be provided by the distributed application 24 or may be based on the implementation costs of different fault tolerance schemes, as described above. Otherwise, if the switching algorithm determines that the current fault tolerance scheme is not responsible for the unacceptable wait time at block 48, it will not switch fault tolerance schemes.

Significant impact is defined as an effect of a fault tolerance scheme on the time spent in communication (C) and the time spent in service (S) that raises the values of these parameters such that the mean wait time (m(W)) increases beyond the mean wait time threshold (T(W)), even if the time spent in fault tolerance (FT) may be comparably less than the time spent in communication (C) and the time spent in service (S).

In order to determine whether the current fault tolerance scheme is having a significant impact on the time spent in communication (C) and the time spent in service (S) at block 48, the switching algorithm 30 obtains two sets of values for wait times W from past runs of the distributed application 24 for a given number of messages (N) that is sufficiently large to make the parameters C, S and FT mutually dependant. The first set of wait time values corresponds to a past run of the distributed application 24 in combination with the current fault tolerance scheme. The second set of wait time values corresponds to a past run of the distributed application 24 without a fault tolerance scheme in place. For example, the client 14 and server 16 in the distributed system of FIG. 1 can measure and store wait times values for the distributed application 24 in a non-volatile, machine readable medium that can be accessed by the switching algorithm, such as the persistent storage 26 or the persistent storage 28, for different types of message logging schemes of the reliable message logging system 18 and various values of the number of messages (N). The switching algorithm then calculates the mean wait time with the fault tolerance scheme in place (m(W_FT)) and the mean wait time without the fault tolerance scheme (m(W_noFT)). If m(W_noFT) is less than the mean wait time threshold (T(W)) and the difference between m(W_FT) and m(W_noFT) is greater than a predetermined percentage amount, for 10 example about 20%, of m(W_FT), then the algorithm determines that the current fault tolerance scheme has a significant impact on the time spent in communication (C) and the time spent in service (S) and attempts to switch fault tolerance schemes. It should be understood that the value of 20% is meant to be illustrative, rather than limiting, and that other values could work also.

Wait Time Threshold Not Exceeded

If the mean wait time (m(W)) is less than the predetermined wait time threshold (T(W)) at block 34, then the switching algorithm will determine whether the user or the distributed application 24 requires more reliability than what the current fault tolerance scheme can provide at block 54.

For example, the client application 20 in FIG. 1 may request a fault tolerance scheme that is more reliable than the fault tolerance scheme currently in use. Alternatively, the server application 22 in the model distributed system 10 of FIG. 1 may have requested a client/server logging scheme when it began execution. However, in order to improve wait times, the switching algorithm 30 may have subsequently switched to a client side logging scheme if the mean wait time (m(W)) increased above the predetermined mean wait time threshold (T(W)). At some time thereafter, the mean wait time could fall below the predetermined mean wait time threshold. The switching algorithm would then determine whether to switch back to the client/server logging scheme initially requested by the server application 22.

If a more reliable fault tolerance scheme is desired, the switching algorithm 30 will determine whether the desired fault tolerance scheme can meet the mean wait time threshold (T(W)) at block 56. In particular, the algorithm determines whether switching fault tolerance schemes will cause the mean wait time (m(W)) to rise above the mean wait time threshold value (T(W)) by a predetermined delta amount (d(W)). The switching algorithm can calculate the expected mean wait time for the desired fault tolerance scheme using past measurements of wait times associated with that fault tolerance scheme. If more than one fault tolerance scheme is available to choose from, the selection criteria can be based on the implementation costs of the different fault tolerance schemes or may be provided by the distributed application 24, as described above.

If it is determined that the switching to the more reliable fault tolerance scheme will not exceed the mean wait time threshold by more than the predetermined delta amount (d(W)), then the algorithm will switch fault tolerance schemes at block 58 and notify the distributed application 24 of any changes in reliability guarantees as well as any performance ramifications at block 60.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

We claim:

1. A method comprising:
   evaluating at least one measured wait time associated with at least one user interface event in relation to a desired level of fault tolerance associated with an application executing-in a system, wherein evaluating the at least one measured wait time comprises comparing the at least one measured wait time to a predetermined threshold by comparing a mean of the at least one measured wait time to a wait time threshold; and
   dynamically selecting use of one of a plurality of fault tolerance schemes to improve user perceived performance of the system.

2. The method defined in claim 1 wherein the wait time threshold is set by the application.

3. The method defined in claim 1 wherein the wait time threshold corresponds to a class of user interface events associated with the application.

4. The method defined in claim 1 wherein the wait time threshold is user changeable.

5. A method comprising:
   determining a mean of at least one measured wait time associated with ax least one user interface event associated with an application executing in a system;
   comparing the mean of the at least one measured wait time to a threshold; and
   selecting use of one of a plurality of fault tolerant schemes to improve user perceived performance of the system to reduce fault tolerance time when communications time, service time and the fault tolerance time are independent with respect to each other.

6. An article of manufacture having one or more recordable media storing instructions thereon which, when executed by a system, cause the system to perform a method comprising:
   determining a mean of at least one measured wait time associated with at least one user interface event associated with an application executing in a system;
   comparing the mean of the at least one measured wait time to a threshold; and
   selecting use of one of a plurality of fault tolerant schemes to improve user perceived performance of the system to reduce fault tolerance time when communications time, service time and the fault tolerance time are independent with respect to each other.

7. An apparatus comprising:
   means for determining a mean of at least one measured wait time associated with at least one user interface event associated with an application executing in a system;
   means for comparing the mean of the at least one measured wait time to a threshold; and
   means for selecting use of one of a plurality of fault tolerant schemes to improve user perceived performance of the system to reduce fault tolerance time when communications time, service time and the fault tolerance time are independent with respect to each other.

8. An article of manufacture having one or more recordable media storing instructions thereon which, when executed by a system, cause the system to perform a method comprising:
   obtaining a wait time of at least one user interface event occurring in the distributed system, the wait time including at least one of a communications time, a service time and a fault tolerance time;
   determining whether a mean of the wait time is greater than a predetermined mean wait time threshold;
   determining whether the communications time, the service time and the fault tolerance time are mutually independent when the mean of the wait time is greater than the predetermined mean wait time threshold;
   determining whether the mean of the wait time can be improved by reducing a mean of the fault tolerance time when the communications time, the service time and the fault tolerance time are mutually independent; and
   switching from a first of the plurality of fault tolerance schemes to a second of the plurality of fault tolerance schemes when the wait time can be improved by reducing the mean of the fault tolerance time.

9. An article of manufacture having one or more recordable media storing instructions thereon which, when executed by a system, cause the system to perform a method comprising:
   comparing at least one measured wait time to a predetermined threshold, wherein comparing the at least one measured wait time comprises comparing a mean of the at least one measured wait time to a wait time threshold;
   evaluating the at least one measured wait time associated with at least one user interface event in relation to a desired level of fault tolerance associated with an application executing in a system; and
   dynamically selecting use of one of a plurality of fault tolerant schemes to improve user perceived performance of the system.

10. The article of manufacture defined in claim 9 wherein the wait time threshold is set by the application.

11. The article of manufacture defined in claim 9 wherein the wait time threshold corresponds to a class of user interface events associated with the application.

12. The article of manufacture defined in claim 9 wherein the wait time threshold is user changeable.

* * * * *